US012774869B2

(12) United States Patent
Narcy

(10) Patent No.: US 12,774,869 B2

(45) Date of Patent: Oct. 27, 2026

(54) SIGHT FOR SHOOTING SYSTEM

(71) Applicant: THALES, Meudon (FR)

(72) Inventor: Gabriel Narcy, Saint Heand (FR)

(73) Assignee: THALES, Meudon (FR)

( * ) Notice: Subject to any disclaimer, the term of this patent is extended or adjusted under 35 U.S.C. 154(b) by 11 days.

(21) Appl. No.: 18/716,462

(22) PCT Filed: Dec. 16, 2022

(86) PCT No.: PCT/EP2022/086387
§ 371 (c)(1),
(2) Date: Jun. 13, 2024

(87) PCT Pub. No.: WO2023/111285
PCT Pub. Date: Jun. 22, 2023

(65) Prior Publication Data

US 2025/0044059 A1 Feb. 6, 2025

(30) Foreign Application Priority Data

Dec. 17, 2021 (FR) ...................................... 2113807

(51) Int. Cl.
*F41G 1/30* (2006.01)
*G02B 23/10* (2006.01)
*G02B 23/14* (2006.01)

(52) U.S. Cl.
CPC ............ *F41G 1/30* (2013.01); *G02B 23/105* (2013.01); *G02B 23/14* (2013.01)

(58) Field of Classification Search
CPC .......... F41G 1/30; F41G 1/34; G02B 23/105; G02B 23/14
See application file for complete search history.

(56) References Cited

U.S. PATENT DOCUMENTS 3,967,876 A * 7/1976 Steck, III ............... G02B 23/14 359/423
4,105,282 A * 8/1978 Schael ................... G02B 23/14 359/364
5,052,800 A * 10/1991 Mimmack ................ F41G 1/54 356/141.5
5,594,584 A * 1/1997 Kay ........................ F41G 1/345 359/429
6,373,628 B1 * 4/2002 Gunnarsson ......... G02B 23/105 359/399
6,519,889 B1 * 2/2003 Schlierbach ......... G02B 23/105 42/131

(Continued)

FOREIGN PATENT DOCUMENTS

WO 2020055319 A1 3/2020

OTHER PUBLICATIONS

FR 2113807, INPI Rapport de Recherche Preliminaire, Oct. 21, 2022, 2 pages.

(Continued)

*Primary Examiner* — Joshua E Freeman
(74) *Attorney, Agent, or Firm* — Soquel Group LLC

(57) ABSTRACT

A sight for a shooting system, including a transparent screen able to display an image, and a catadioptric optical device able to collimate an incident light beam coming from the image displayed on the transparent screen into a sighting window superimposed on the direct view of a scene.

10 Claims, 3 Drawing Sheets

(56) References Cited

U.S. PATENT DOCUMENTS

| | | | | |
|---|---|---|---|---|
| 7,051,469 | B1 * | 5/2006 | Pochapsky | G02B 23/12<br>42/111 |
| 8,054,555 | B2 * | 11/2011 | Yamada | G02B 27/30<br>359/645 |
| 2013/0033746 | A1 * | 2/2013 | Brumfield | G02B 23/105<br>359/422 |
| 2013/0286472 | A1 * | 10/2013 | Arai | F41G 1/38<br>359/364 |
| 2014/0026464 | A1 * | 1/2014 | Wiklund | F41G 3/06<br>42/131 |
| 2015/0168102 | A1 * | 6/2015 | Jeung | F41G 1/30<br>42/130 |
| 2019/0346235 | A1 * | 11/2019 | Sidelkovsky | F41G 3/08 |
| 2022/0099409 | A1 * | 3/2022 | Larsson | F41G 1/38 |

OTHER PUBLICATIONS

PCT /EP2022/086387, International Search Report, Mar. 13, 2023, 2 pages.

* cited by examiner

SIGHT FOR SHOOTING SYSTEM

CROSS-REFERENCE TO RELATED APPLICATIONS

This application claims benefit under 35 USC § 371 of PCT Application No. PCT/EP2022/086387 entitled SIGHT FOR SHOOTING SYSTEM, filed on Dec. 16, 2022 by inventor Gabriel Narcy. PCT Application No. PCT/EP2022/086387 claims priority of French Patent Application No. 21 13807, filed on Dec. 17, 2021.

FIELD OF THE INVENTION

The present invention relates to a sight for a shooting system. The present invention also relates to a firing assembly comprising a firing system and such a sight.

BACKGROUND OF THE INVENTION

During armed field missions, infantrymen need to use firing aids, such as sights or rifle scopes, to help them aim accurately.

For this purpose, sighting solutions such as clear sights, also referred to as reflex sights, are known. A clear sight is an optical assembly used to superimpose an image on an observed scene. The image is, for example, a symbol, a point of light or even a thermal image. Classically, a clear sight reflects the image from a display to infinity and superimposes it on the scene observed through the sight. Such a sight generally comprises lenses, shutters and reflecting mirrors.

However, such clear sights generally present either a reduced image projection field or a small exit pupil or are bulky.

A small projection field is problematic when it comes to projecting images with a field of view larger than an aiming point or graticule. In addition, a small exit pupil is detrimental to aiming comfort.

Bulky sights are due in particular to the eccentricity of the sighting optics, which allows the image projection field to be increased but takes up valuable space and reduces optical quality (aberrations).

There is, therefore, a need for a clear sight solution that allows images to be projected over a wider field than a simple aiming graticule, while being compact and offering good aiming comfort.

SUMMARY OF THE DESCRIPTION

To this end, the present description has as its object a sight in which the optical device comprises:

a. a first optical unit able to collimate an incident light beam from the displayed image, the first optical unit having an optical power, and b. a second optical unit able to compensate the power of the first optical unit for direct vision of the scene.

According to particular embodiments, the sight comprises one or more of the following features, taken alone or in any technically possible combinations:

the optical device comprises:

a. a first optical unit able to collimate an incident light beam from the displayed image, the first optical unit having an optical power, and b. a second optical unit able to compensate the power of the first optical unit for direct vision of the scene;

the first optical unit comprises a semi-reflecting mirror able, on the one hand, to reflect and collimate the incident light beam from the displayed image and, on the other hand, to transmit the light beam resulting from the direct vision of the scene;

the semi-reflecting mirror is a Mangin mirror;

the Mangin mirror is formed by a doublet comprising a divergent lens coupled with a convergent lens;

the second optical unit is a counter-form comprising diopters only;

the optical device is centered on an optical axis; the transparent screen being centered on the optical axis of the optical device;

the optical device presents an exit pupil, the dimensions of the exit pupil being greater than or equal to 30 mm in diameter when the exit pupil is circular, and greater than or equal to 30 mm in length and 30 mm in width when the exit pupil is rectangular;

the sight is devoid of any element having optical power between the transparent screen and the sighting window.

The present description also concerns a shooting assembly comprising a shooting system and a sight as previously described.

BRIEF DESCRIPTION OF THE DRAWINGS

Further features and advantages of the invention will become apparent from the following description of embodiments of the invention, given by way of example only and with reference to the drawings which are.

DETAILED DESCRIPTION OF EMBODIMENTS

Figure 1:
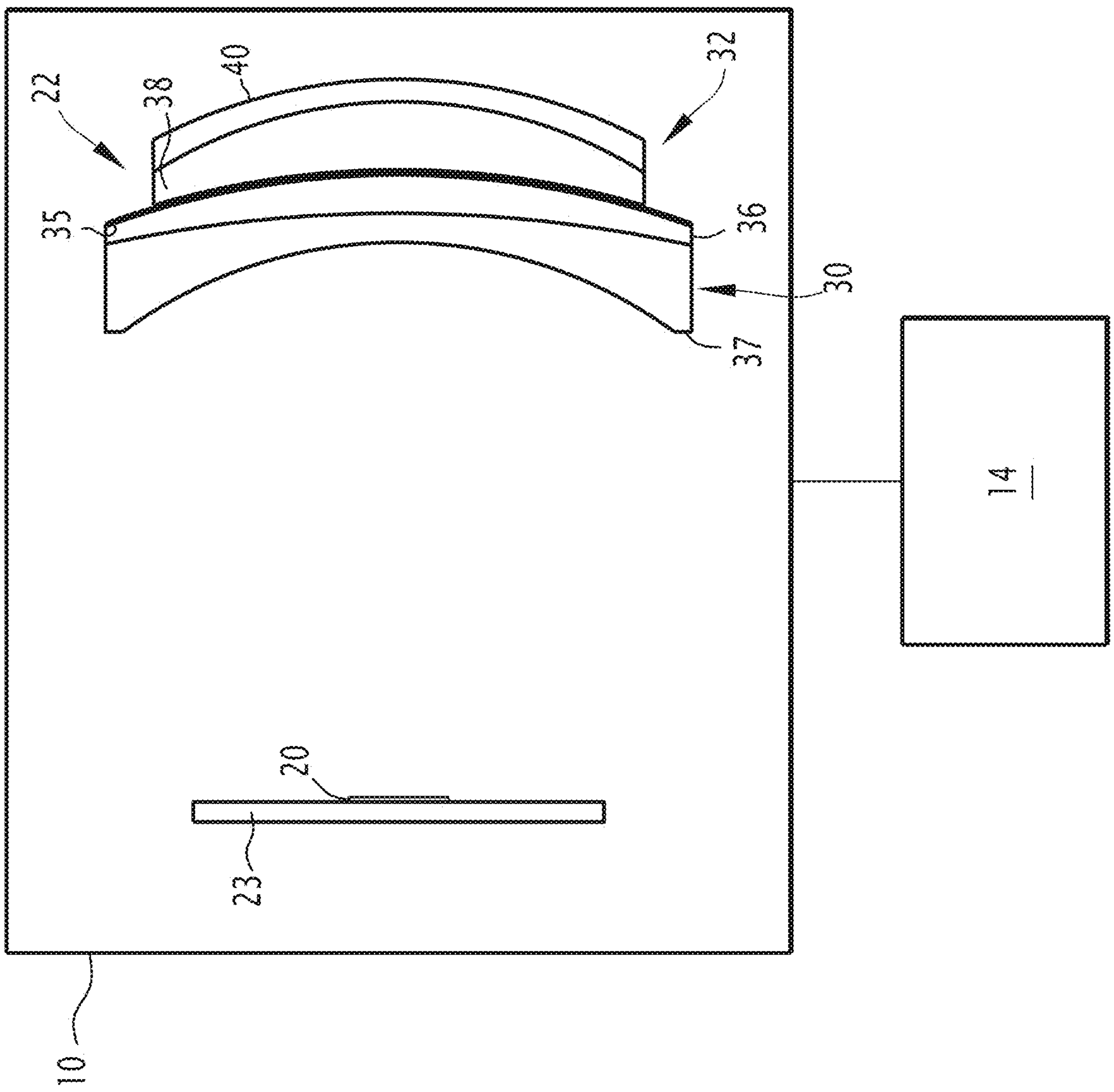
FIG. 1, a schematic representation of an assembly comprising a sight and a firing system, FIG. 2, the sight of FIG. 1 on which the light rays from an image displayed on a transparent screen of the sight have been represented, and FIG. 3, the sight of FIG. 1 on which the light rays coming from the direct vision of a scene and arriving in the eye of an observer have been represented.

A sight 10 and a firing system 14 are illustrated in FIG. 1.

The firing system 14 is able to fire projectiles, such as bullets. The firing system 14 is, for example, a weapon such as a handgun or rifle. The firing system 14 presents a firing axis, also referred to as the barrel axis.

The sight 10 is able to assist the aiming by a user of the firing system 14. For example, the sight 10 is able to display the indications relating to the anticipated point of impact of a projectile fired by the firing system 14 or additional information relating to the scene observed by the user in direct vision (for example, display of thermal images superimposed on the direct vision of the scene). The scene is the portion of space in the field of view of a user of the sight 10.

The sight 10 is a so-called clear or reflex sight, in other words, a sight through which a scene can be observed in direct vision in a sighting window. In other words, an image of the scene is reflected to infinity in a sighting window that can be viewed by the user. The sighting window defines the set of viewing directions of a user for which the scene is seen in direct vision.

Figure 2:
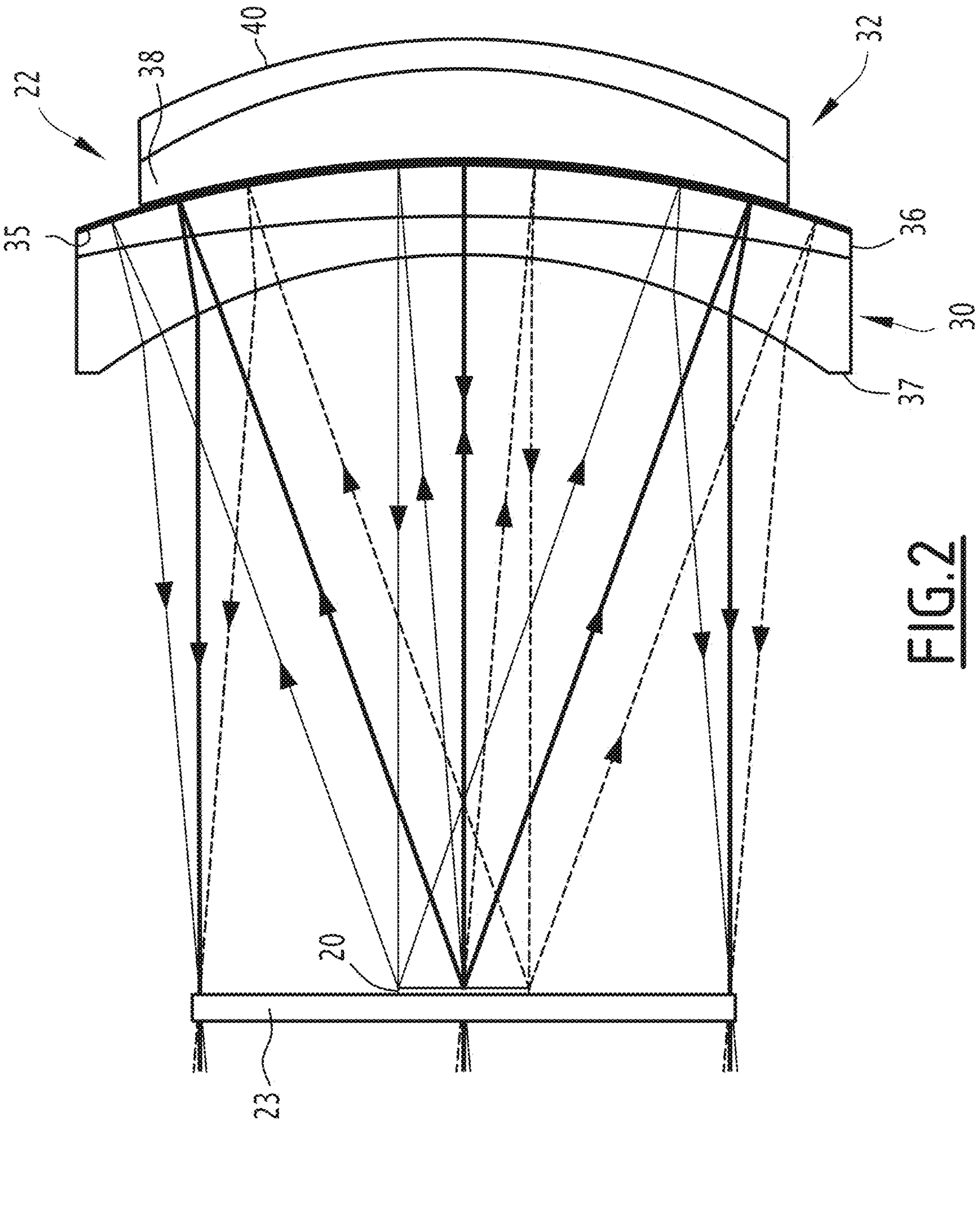
Figure 3:
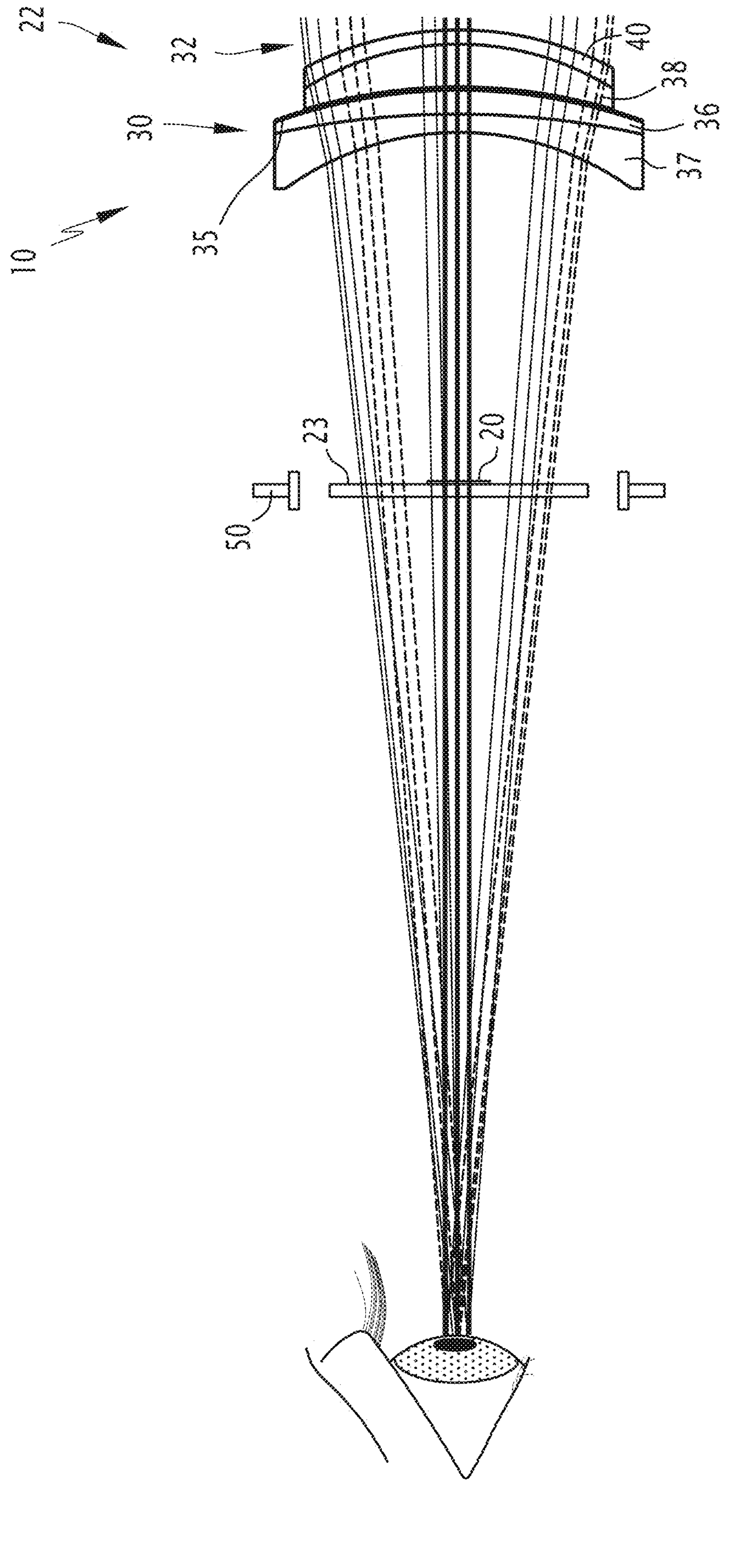

As illustrated in FIGS. 1 to 3, the sight 10 comprises a transparent screen 20 and an optical device 22.

The transparent screen 20 is able to display images. The images are, for example, images of an aiming indicator, such as an aiming dot or graticule, or additional information, for example, thermal images (spectral range 8 μm-12 μm) of the scene, which are superimposed on the direct vision.

By the term “transparent screen”, it is understood to mean, a screen that allows a user to see what is displayed on the screen while being able to see through the screen. The surrounding light therefore passes through the screen.

The transparent screen 20 is, for example, an OLED screen (Organic Light Emitting Diode).

In the example shown in FIGS. 1 to 3, the transparent screen 20 is arranged so that the light beam from the image displayed on the transparent screen 20 is directed in the opposite direction to the direction of arrival of the beam resulting from the direct vision of the scene. In other words, the image displayed by the transparent screen 20 is not directly visible to an observer looking through the sighting window, but only when reflected to infinity.

Optionally, as illustrated in FIGS. 1 to 3, the transparent screen 20 is arranged on a transparent support 23, such as a glass slide. This allows the transparent screen 20 to be protected.

The optical device 22 is able to collimate an incident light beam, coming from the image displayed on the transparent screen 20, in the sighting window superimposed on the direct vision of a scene.

By the term “collimate” in relation to a light beam, it is understood that the light rays forming the beam are virtually parallel as they propagate. The light rays of a collimated beam are thus reflected to infinity.

The optical device 22 is a catadioptric device. A catadioptric device is a device comprising at least one refractive surface and at least one reflective surface.

Preferably, the optical device 22 is a system centered on an optical axis, in other words, that all the optics of the optical device 22 are rotationally symmetrical centered on the optical axis of the optical device 22. In this case, the transparent screen 20 is preferably centered on the optical axis of the optical device 22.

Alternatively, when the center of the transparent screen 20 is offset from the optical axis of the optical device 22, the optical device 22 is not necessarily a centered system and comprises, for example, optics using FreeForm technology, also referred to as digital lenses. In this case, the offset of the transparent screen 20 is such that the transparent screen is in the path of the collimated light beam in the sighting window. Preferably, the number of optics forming the optical device 22 is less than or equal to five. This allows to limit the weight and size of the optical device 22 and therefore of the sight 10.

The optical device 22 presents an exit pupil. For example, as illustrated in FIG. 3, the exit pupil is delimited by a diaphragm 50.

Preferably, the dimensions of the exit pupil are greater than or equal to 30 mm, preferably greater than or equal to 40 mm, in diameter when the exit pupil is circular. Preferably, the dimensions of the exit pupil are greater than or equal to 30 mm in length and 30 mm in width, preferably greater than or equal to 40 mm in length and 40 mm in width, when the exit pupil is rectangular. As illustrated in FIGS. 1 to 3, the optical device 22 comprises a first optical unit 30 and a second optical unit 32.

The first optical unit 30 is able to collimate the incident light beam coming from the image displayed on the transparent screen 20. More precisely, the first optical unit 30 is able to reflect the light beam coming from the displayed image to infinity.

The first optical unit 30 has an optical power, so-called first (non-zero) optical power. The optical power of a system is the ratio of the angle at which the eye sees the image of an object at the output of the system to the size of the object.

The assembly formed by the transparent screen 20 and the first optical unit 30 forms a projection path for the image displayed on the transparent screen 20, in the direction of a gaze of the user (sighting window).

In one example embodiment, the first optical unit 30 comprises a semi-reflective mirror 35. The term “semi-reflective mirror” is understood to mean a mirror able to reflect a light beam arriving on one of its faces (reflecting face) and to transmit a light beam arriving on the opposite face (non-reflecting face).

The semi-reflective mirror 35 is able to, on the one hand, reflect and collimate the incident light beam coming from the displayed image, and, on the other hand, to transmit the light beam resulting from direct vision of the scene.

The semi-reflective treatment is, for example, of the 50% reflection, 50% transmission type, in the visible spectrum, but could be of another type in order to favor the brightness of the screen perceived relative to the brightness of the scene. Alternatively, the semi-reflective coating can be 100% dichroic in reflection, high-pass, or band-pass, centered on the emission spectrum of the screen, when the screen is monochrome (red, for example).

Preferably, as illustrated in FIGS. 1 to 3, the semi-reflective mirror 35 is a Mangin mirror. A Mangin mirror is a lens or lens assembly forming a negative meniscus with a reflective or semi-reflective (in this case) treatment on the rear face of the lens (the last one) forming a curved mirror that reflects light without spherical aberration. A lens with a negative meniscus has a steeper concave surface and is thinner at the center than at the periphery. The use of a Mangin mirror allows to facilitate the correction of aberrations over a wider field than a mirror.

Preferably, as illustrated in FIGS. 1 to 3, the Mangin mirror is a doublet formed by a divergent lens 37 (of low dispersive index) and a convergent lens 38 (of dispersive index) comprising a semi-reflective treatment on the surface of the convergent lens, not coupled to the divergent lens 38. Such a doublet allows, in particular, to correct the chromatism when using a screen of wide spectral band.

The second optical unit 32 is chosen in order to compensate the first optical power for direct vision of the scene and thus, to ensure that the optical power for direct traversal is zero. The first optical unit 30 and the second optical unit 32 thus form a direct view of the scene.

The second optical unit 32 has an optical power, the so-called second optical power. The second optical power is, thus, opposite to the first optical power. Thus, this allows light to be reflected coming from the scene to infinity, so that it can be viewed directly by the user.

The second optical unit 32 is a counter-form, in other words, an optical assembly the shape of which couples with the shape of the first optical unit 30. Preferably, the second optical unit 32 comprises only diopters. In the example shown in FIGS. 1 to 3, the second optical unit 32 is formed by a doublet of a converging lens 38 and a diverging lens 40. The converging lens 38 is coupled to the semi-reflective surface of the Mangin mirror.

In an optional alternative, the distance of the counter-form from the Mangin mirror is adjusted to introduce optical magnification on the direct-view path. The first optical power is then only partially compensated.

Preferably, the optics of optical device 22 are aspherical optics, which allows the aberrations to be limited. For example, the asphericity coefficients are calculated in order to reduce at least one of: the distortion on the projection path, the distortion on the direct path, the parallax on the projection path and particularly on the projection field of the aiming graticule when the eye explores the exit pupil of the device, and the parallax between the direct path and the projection path, particularly on the projection field of the aiming graticule.

Preferably, the sight 10 is devoid of any element having optical power (that is, non-zero optical power) between the transparent screen 20 and the sighting window, in other words, on the side of the transparent screen opposite the first optical unit 30.

The operation of the sight 10 will now be described with particular reference to FIGS. 2 and 3. It will be understood that FIGS. 2 and 3 break down the light path on the projection path on the one hand, and on the direct viewing path on the other. However, under operating conditions, all the light beams in FIGS. 2 and 3 are superimposed.

In particular, FIG. 2 illustrates the light beams coming from the image displayed on the transparent screen 20. As can be seen in FIG. 2, the light beam coming from the transparent screen 20 is reflected on the semi-reflective surface of the first optical unit 30 and reflected to infinity in direct vision. As illustrated in FIG. 3, the fact that the screen is a transparent screen 20, the direct vision of the user is not affected.

Thus, the previously described sight 10 allows, by using a transparent screen 20, to obtain a clear sight architecture with an improved compromise for the compactness, the pupil diameter and the image projection field. In particular, the use of a transparent screen 20 allows in-line optics to be proposed, as opposed to off-axis optics the aberration correction of which is more complex.

The proposed sight 10 is simple to manufacture and presents a reduced number of elements relative to the state of the art solutions. Such a sight 10 also presents a better compactness relative to such solutions, while offering a larger exit pupil diameter. In particular, the pupil diameter can be increased by a factor of two relative to prior art architectures. Thus, pupil dimensions in the range 40 mm to 50 mm can be obtained.

The skilled person will understand that the previously described embodiments and alternatives can be combined to form new embodiments provided that they are technically compatible.

The invention claimed is:

1. A sight for a shooting system, comprising:

a transparent screen comprising a transparent electronic display displaying an image on its transparent surface, the light forming the displayed image being emitted by the display; and a catadioptric optical device collimating an incident light beam, from the image displayed on said transparent screen, into a sighting window superimposed on the direct vision of a scene, the optical device presenting an exit pupil delimited by a diaphragm.

2. The sight according to claim 1, wherein said optical device comprises:

a first optical unit collimating an incident light beam coming from the displayed image, the first optical unit having optical power; and a second optical unit compensating the power of said first optical unit for direct vision of the scene.

3. The sight according to claim 2, wherein said first optical unit comprises a semi-reflecting mirror reflecting and collimating the incident light beam coming from the displayed image, and transmitting the light beam resulting from direct vision of the scene.

4. The sight according to claim 3, wherein said semi-reflecting mirror comprises a Mangin mirror.

5. The sight according to claim 4, wherein said Mangin mirror is formed by a doublet comprising a divergent lens coupled to a convergent lens.

6. The sight according to claim 2, wherein said second optical unit is a counter-form comprising diopters only.

7. The sight according to claim 1, wherein said optical device and said transparent screen are centered on a common optical axis.

8. The sight according to claim 1, wherein the dimensions of the exit pupil are greater than or equal to 30 mm in diameter when the exit pupil is circular, and greater than or equal to 30 mm in length and 30 mm in width when the exit pupil is rectangular.

9. The sight according to claim 1, wherein the sight is devoid of any element having optical power between said transparent screen and the sighting window.

10. A shooting assembly comprising:

a shooting system; and a sight according to claim 1.

* * * * *